United States Patent
Amamori (10) Patent No.: US 7,125,043 B2
(45) Date of Patent: Oct. 24, 2006

(54) AIRBAG DEVICE

(75) Inventor: Ichiro Amamori, Hikone (JP)

(73) Assignee: Takata Corporation, Tokyo (JP)

( * ) Notice: Subject to any disclaimer, the term of this patent is extended or adjusted under 35 U.S.C. 154(b) by 316 days.

(21) Appl. No.: 10/785,977

(22) Filed: Feb. 26, 2004

(65) Prior Publication Data

US 2004/0195808 A1    Oct. 7, 2004

(30) Foreign Application Priority Data

Apr. 2, 2003  (JP) .............................. 2003-099391
Dec. 12, 2003  (JP) .............................. 2003-415190

(51) Int. Cl.
*B60R 21/16*    (2006.01)
*B60R 21/20*    (2006.01)
*B60R 21/203*    (2006.01)
*B60R 21/215*    (2006.01)

(52) U.S. Cl. .............................. 280/743.1; 280/728.2; 280/731

(58) Field of Classification Search ............. 280/743.1, 280/728.2, 731, 732, 743.2, 728.1; B60R 21/16, B60R 21/20, 21/203, 21/205, 21/215, 21/217
See application file for complete search history.

(56) References Cited

U.S. PATENT DOCUMENTS

| | | | | |
|---|---|---|---|---|
| 5,435,593 A * | 7/1995 | Hiramitsu et al. | ......... | 280/728.2 |
| 5,498,023 A * | 3/1996 | Adams et al. | .......... | 280/728.2 |
| 5,498,031 A * | 3/1996 | Kosugi | ..................... | 280/743.2 |
| 5,636,862 A * | 6/1997 | Cheung et al. | .......... | 280/730.2 |
| 5,992,875 A * | 11/1999 | Cundill | .................... | 280/728.2 |
| 6,070,904 A * | 6/2000 | Ozaki et al. | .............. | 280/743.1 |
| 6,186,534 B1 * | 2/2001 | Heinz | ....................... | 280/728.2 |
| 6,206,409 B1 * | 3/2001 | Kato et al. | ................ | 280/728.2 |
| 6,364,348 B1 * | 4/2002 | Jang et al. | ................ | 280/730.2 |
| 6,422,602 B1 | 7/2002 | Ishii et al. | | |
| 6,471,238 B1 | 10/2002 | Ishikawa et al. | | |
| 6,502,858 B1 * | 1/2003 | Amamori | .................. | 280/743.2 |
| 6,517,099 B1 * | 2/2003 | Igawa et al. | ............. | 280/728.2 |
| 6,585,292 B1 | 7/2003 | Abe et al. | | |
| 6,610,000 B1 | 8/2003 | Ishii et al. | | |
| 6,883,831 B1 * | 4/2005 | Hawthorn et al. | .......... | 280/739 |
| 6,942,242 B1 * | 9/2005 | Hawthorn et al. | ....... | 280/728.2 |
| 6,962,366 B1 * | 11/2005 | Fukuda et al. | ........... | 280/743.1 |
| 7,029,024 B1 * | 4/2006 | Baumbach | ................ | 280/728.2 |
| 7,059,634 B1 * | 6/2006 | Bossecker et al. | .......... | 280/739 |
| 2004/0207186 A1 * | 10/2004 | Kai | ............................ | 280/731 |

FOREIGN PATENT DOCUMENTS

| | | |
|---|---|---|
| JP | 5-92004 | 12/1993 |
| JP | 6-53324 | 7/1994 |
| JP | 6-53365 | 7/1994 |
| JP | 9-30425 | 2/1997 |

(Continued)

*Primary Examiner*—David R. Dunn
*Assistant Examiner*—Joselynn Y. Sliteris
(74) *Attorney, Agent, or Firm*—Manabu Kanesaka (57) ABSTRACT

An airbag device is provided with a retainer, an airbag mounted on the retainer, an airbag-mounting ring to mount the airbag to the retainer, an inflator to inflate the airbag, a shape-maintaining component to maintain a folded shape of the airbag, and a module cover covering the folded airbag. The shape-maintaining component is fixed to bolts. A central portion of the shape-maintaining component is attached to a central portion of a front panel of the airbag with a seam thread. When the inflator is mounted on the retainer, since a space is provided in the retainer, a front-end side of the inflator is smoothly inserted.

10 Claims, 12 Drawing Sheets

FOREIGN PATENT DOCUMENTS

| | | |
|---|---|---|
| JP | 2000-153744 | 6/2000 |
| JP | 2000-264157 | 9/2000 |
| JP | 2000-296746 | 10/2000 |
| JP | 2000-326815 | 11/2000 |
| JP | 2001-18741 | 1/2001 |
| JP | 2001-180427 | 7/2001 |
| JP | 2001-277977 | 10/2001 |
| JP | 2001270405 A * | 10/2001 |
| JP | 2002-316605 | 10/2002 |

* cited by examiner

AIRBAG DEVICE

AIRBAG DEVICE

BACKGROUND OF THE INVENTION AND RELATED ART STATEMENT

The present invention relates to an airbag device to protect a vehicle occupant in the event of a collision and the like, and more specifically, relates to an airbag device to be assembled while a folded shape of an airbag is maintained by a shape-maintaining component.

In general, an airbag device serving as a protector for an occupant in a vehicle and the like is configured to include an folded airbag, an inflator to supply gas to the airbag, bag holding components, e.g., a base plate and a case, on which the airbag and the inflator are mounted and fixed, and a cover which is disposed to cover a top surface of the folded airbag and which is torn by an inner pressure of the airbag when the airbag device is actuated.

In such an airbag device, the folded shape of the airbag may be maintained with a shape-maintaining component for the purposes of improving workability in mounting of the above-described cover and of preventing the deformation of the cover due to spontaneous restitution force of the airbag from the folded state during the mounting on a vehicle.

Japanese Patent Publication (Kokai) No. 2000-296746 has disclosed an airbag device including a sheet with a shape of a crank-like long belt serving as the shape-maintaining component, and a folded shape of the airbag has been described in detail in the reference.

Figure 7:
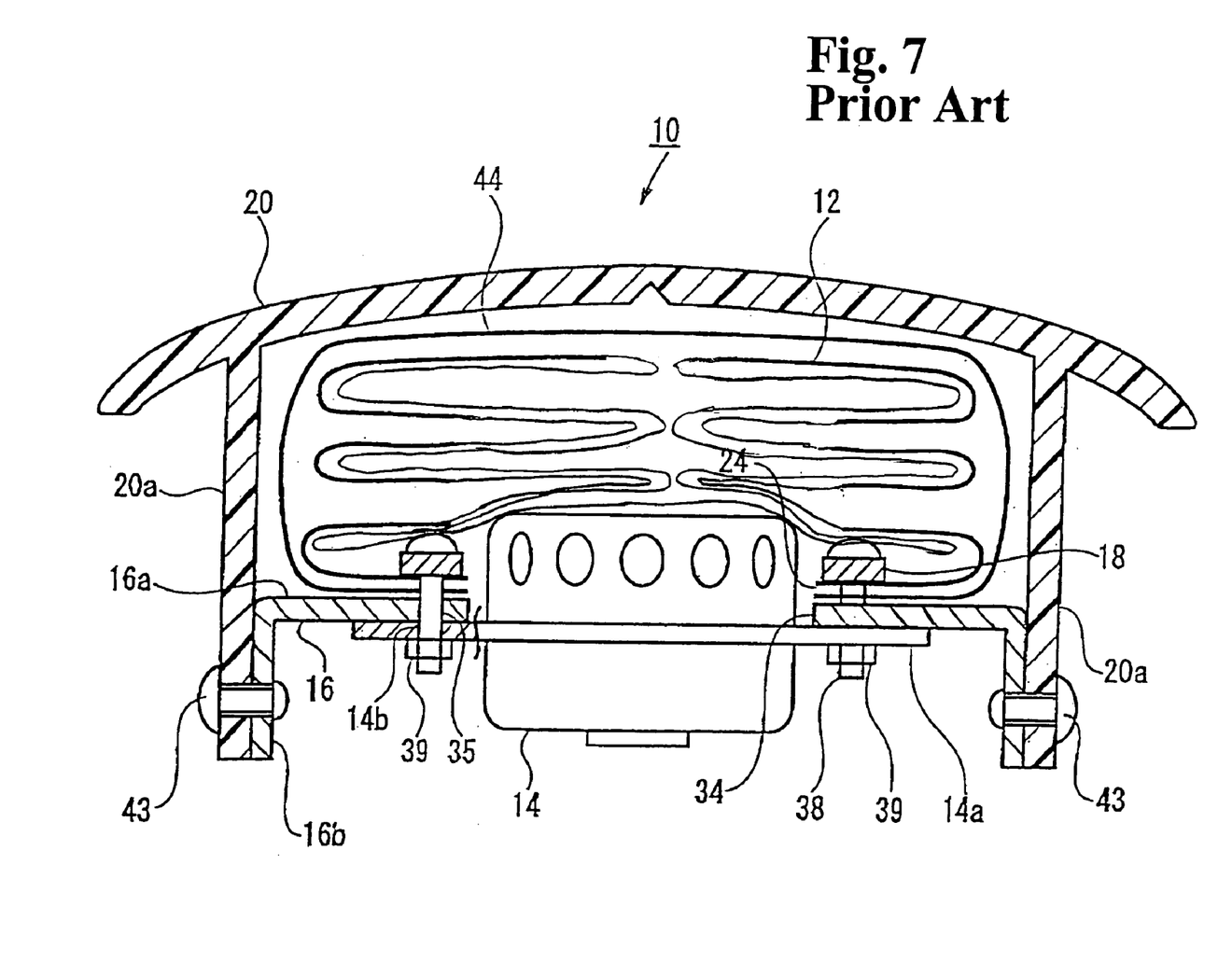
FIG. 7 is a sectional view of a conventional airbag device.
Figure 8A:
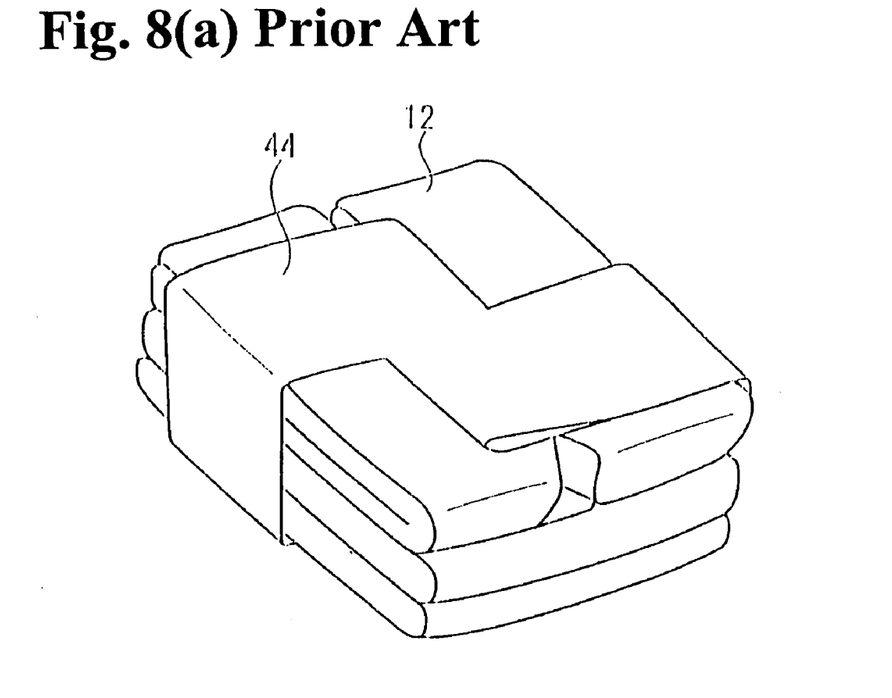
FIGS. 8(a) and 8(b) are perspective views of a folded body of the conventional airbag device.
Figure 8B:
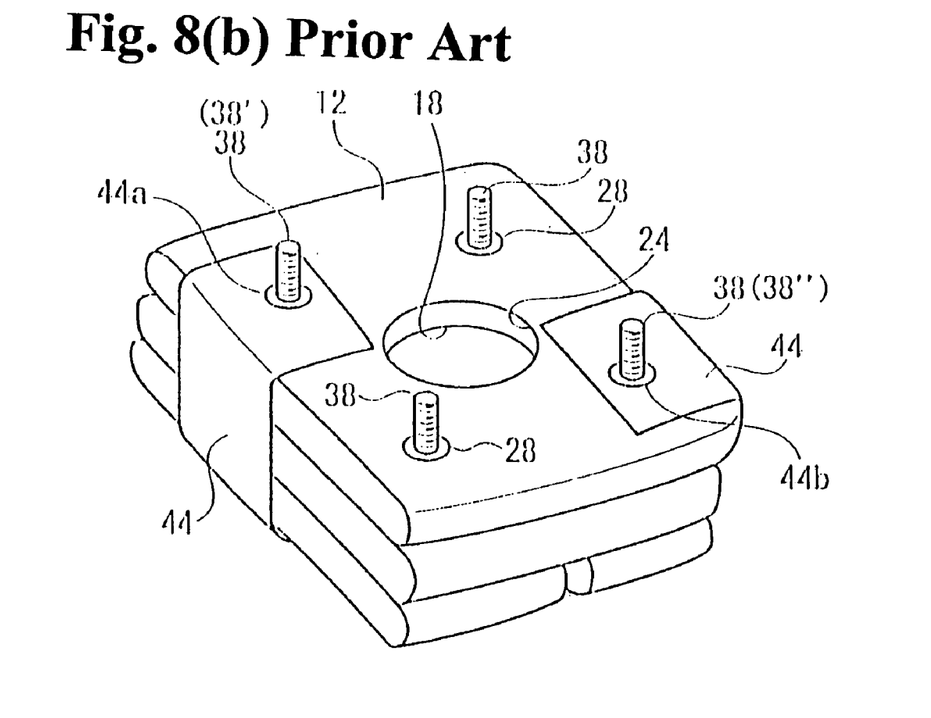

FIG. 7 is a sectional view of an airbag device 10 shown in the above-described reference, and FIGS. 8(a) and 8(b) are perspective views showing a state in which an airbag 12 is held with a shape-maintaining component 44.

The airbag device 10 is a driver airbag disposed at a central portion of a steering wheel of an automobile, and is configured to include the airbag 12, an inflator 14, a retainer (referred to as a base plate in the above-described reference) 16, a bag-mounting ring 18, and a module cover 20.

The airbag 12 has a bag shape formed by sewing perimeters of substantially circular two panels (a front panel and a rear panel) with each other, and the rear panel disposed in the inflator 14 side is provided with an opening (mouth portion) 24 for the insertion of the inflator 14 in the central portion.

A mounting flange 14a is provided around the inflator 14, and a gas eject portion is provided on a side perimeter surface of the inflator 14 at a side closer to the front-end than the flange 14a.

The base plate 16 is composed of a substantially rectangular plate-shaped portion 16a and leg plate portions 16b bending downwardly at an edge of the plate-shaped portion 16a.

An inflator insertion port 34 is provided at a central portion of the plate-shaped portion 16a of the base plate 16, and the front-end side of the inflator 14 is inserted in the inflator insertion port 34 from the backside, as shown in FIG. 7. The mouth portion 24 of the airbag 12 is mounted and fixed on the perimeter of the inflator insertion port 34 with the mounting rings 18 therebetween.

The mounting ring 18 is a ring-shaped metal component provided with bolts 38 protruding. The bolt 38 is inserted through a bolt through hole 28 provided at a perimeter of the mouth portion 24, and furthermore, is inserted through both a bolt through hole 35 provided in the perimeter of the opening 34 of the base plate 16 and a through hole 14b provided in the flange 14a of the inflator 14, with a nut 39 screwed in.

The leg portions 20a of the module cover 20 are fixed to the leg plate portions 16b with rivets 43, so that the module cover 20 is mounted on the base plate 16.

Reference numeral 44 denotes the shape-maintaining component covering the airbag 12 in a predetermined folded shape in order to maintain the folded shape.

In assembling the airbag device 10, after the airbag 12 is folded as shown in FIGS. 8(a) and 8(b), the bolt 38' of the mounting ring 18 is inserted through a through hole 44a provided at one end portion of the shape-maintaining component 44. Then, the shape-maintaining component 44 is put over the folded airbag 12, and the bolt 38" opposite to the above-described bolt 38' on a diagonal line is inserted through a through hole 44b at the other end portion. In this manner, the shape of the folded airbag 12 is maintained.

The base plate 16 is put over the folded body of the airbag 12, and the bolts 38 are inserted through the bolt through holes 35. The front-end side of the inflator 14 is pushed in the airbag 12 through the opening 34 and the mouth portion 24, and the flange 14a is put on the backside of the base plate 16. At this time, the bolts 38 are inserted through the bolt through holes 14b. The nuts 39 are screwed in the bolts 38. Subsequently, the module cover 20 is put over the folded-airbag portion, and is fixed with rivets 43.

In assembling the airbag device 10, when the module cover 20 is mounted on the base plate 16 while being put over the folded body of the airbag 12, the shape-maintaining component 44 maintains the folded shape of the airbag 12. Consequently, the cover 20 is readily put over the airbag 12 so that the airbag device 10 has excellent workability in assembling. Even after the airbag device 10 is mounted on a vehicle, since the shape-maintaining component 44 maintains the folded shape of the airbag 12, the force caused by the spontaneous restitution of the shape from the folded state can be reduced while the force is applied to the cover 20, thereby preventing the deformation of the cover 20.

When the airbag 12 is inflated by the gas discharged from the inflator 14 in the event of a collision of the vehicle, the shape-maintaining component 44 is torn. The airbag 12 pushes the module cover 20 to open, and is deployed.

As described above, the airbag is folded into the predetermined shape in assembling the airbag device 10. An example of the folding method has been described in detail in Japanese Patent Publication (Kokai) No. 2002-316605.

FIGS. 9(a)–9(f) to 13 are diagrams for illustrating the method of folding an airbag in the above-described reference. An airbag 50 is formed by sewing a front panel 51 and a rear panel 52 with each other, and the rear panel 52 is provided with a gas inlet (mouth portion) 54 and a vent hole 55.

Figure 9A:
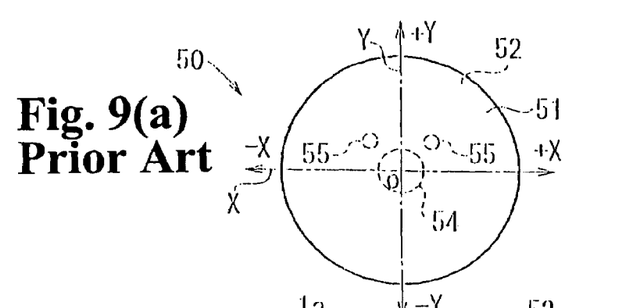
FIGS. 9(a)–9(f) are diagrams for illustrating a method of folding an airbag.

As shown in FIG. 9(a), the front panel 51 of the airbag 50 is allowed to face upward, and the airbag 50 is placed on a flat worktable in a flat shape. In this case, two straight lines intersecting at a center ○ serves as reference axes X and Y, and specify horizontal and vertical directions.

Figures 9B, 9C:
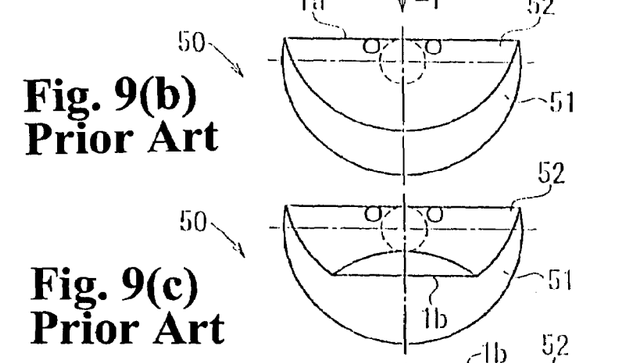
Figure 9D:
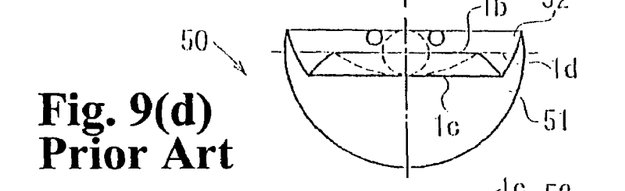
Figure 9E:
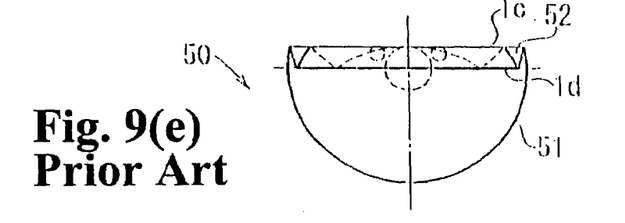
Figure 9F:
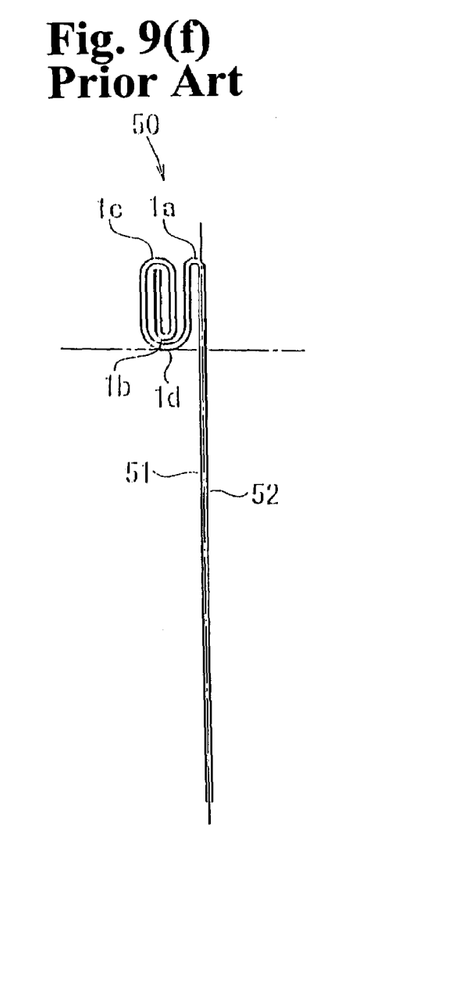

As shown in FIG. 9(b), an upper part of the airbag 50 is folded along a predetermined first folding line 1a adjacent to the gas inlet 54. As shown in FIGS. 9(c) to 9(e) and 9(f), an end portion of the upper part is rolled along predetermined folding lines 1b, 1c and 1d, toward the front panel side to form an upper deployment portion 61 shown in FIG. 13.

Figure 10A:
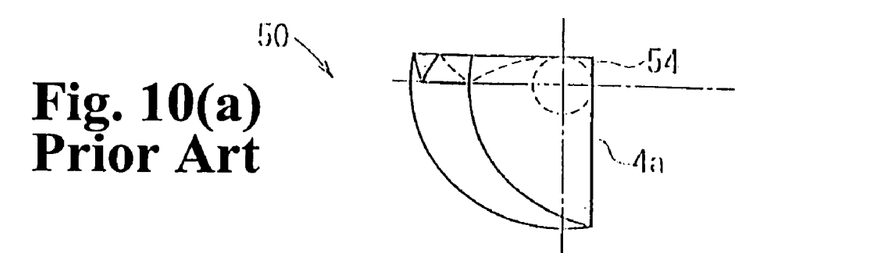
FIGS. 10(a)–10(e) are diagrams for illustrating a method of folding the airbag.
Figure 10B:
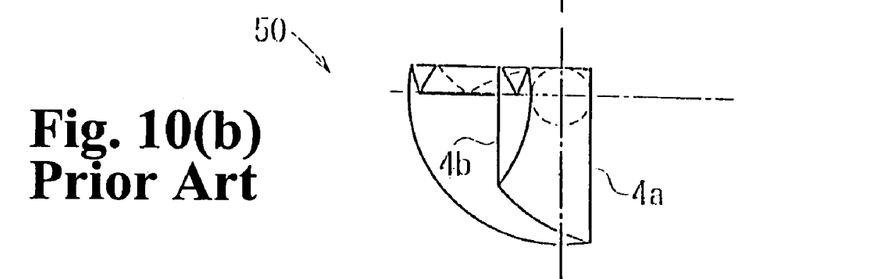
Figure 10C:
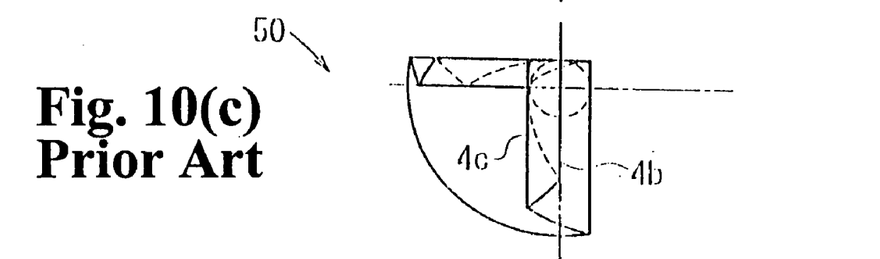
Figure 10D:
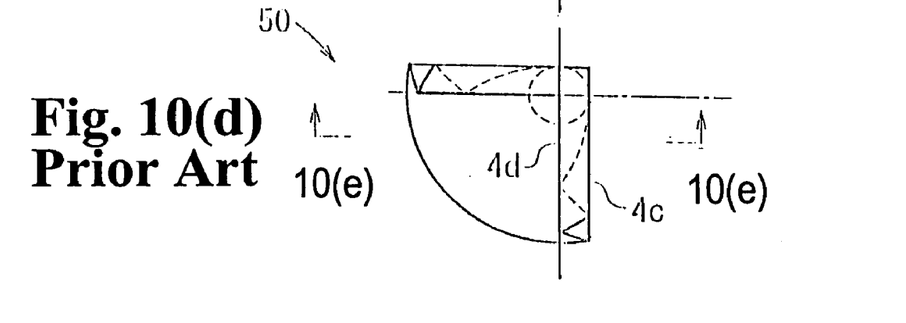
Figure 10E:
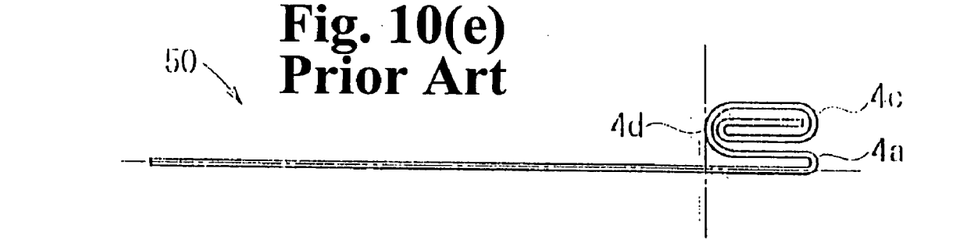

As shown in FIG. 10(a), a right side part is folded over a central part along a predetermined first folding line 4a adjacent to the gas inlet 54. As shown in FIGS. 10(b) to 10(d) and 10(e), an end portion of the right side part is rolled along predetermined folding lines 4b, 4c and 4d toward the front panel side to form a right deployment portion 64 shown in FIG. 13.

Figure 11A:
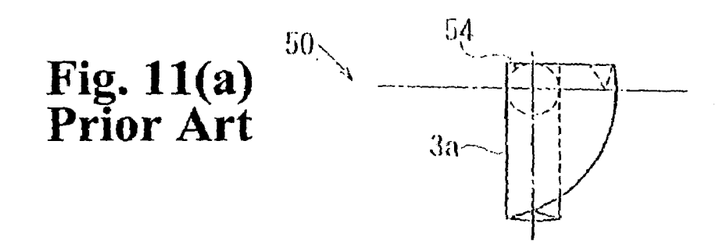
FIGS. 11(a)–11(e) are diagrams for illustrating a method of folding the airbag.
Figure 11B:
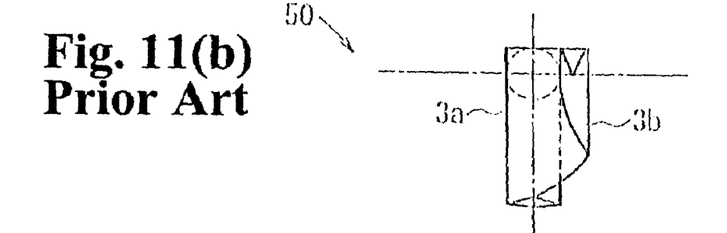
Figure 11C:
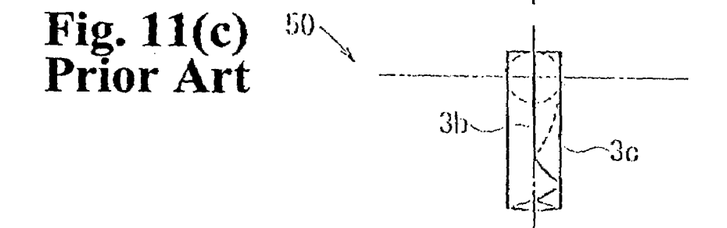
Figure 11D:
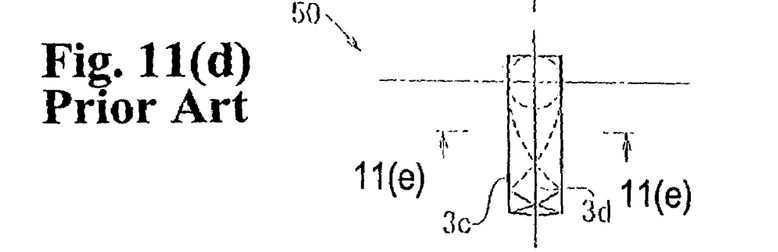
Figure 11E:
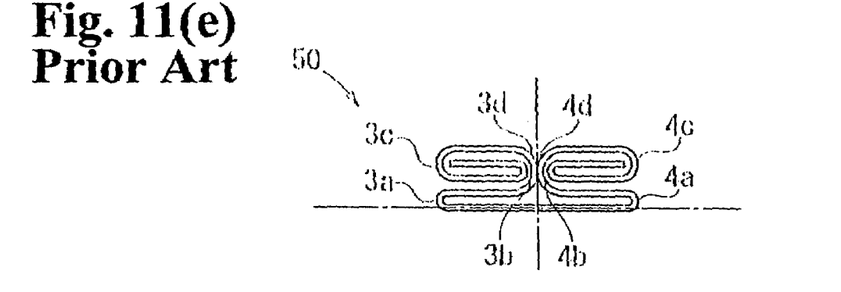

As shown in FIG. 11(a), a left side part is folded over the central part along a predetermined first folding line 3a adjacent to the gas inlet 54. As shown in FIGS. 11(b) to 11(d) and 11(e), an end portion of the left side part is rolled along predetermined folding lines 3b, 3c and 3d toward the front panel side to form a left deployment portion 63 shown in FIG. 13.

Figure 12A:
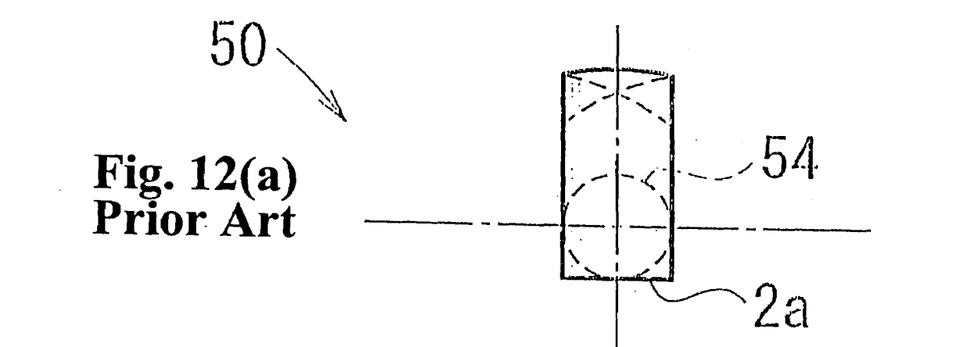
FIGS. 12(a)–12(d) are diagrams for illustrating a method of folding the airbag.
Figure 12B:
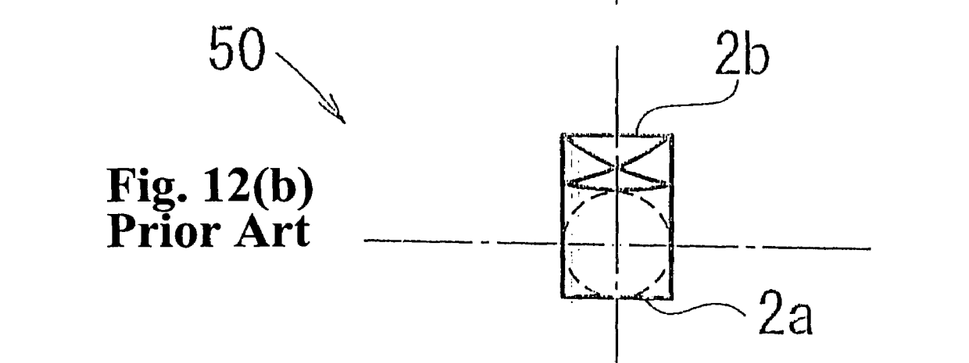
Figure 12C:
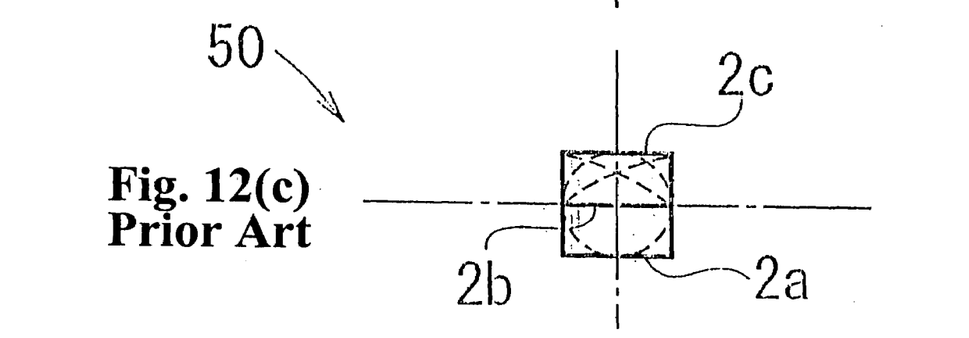
Figure 12D:
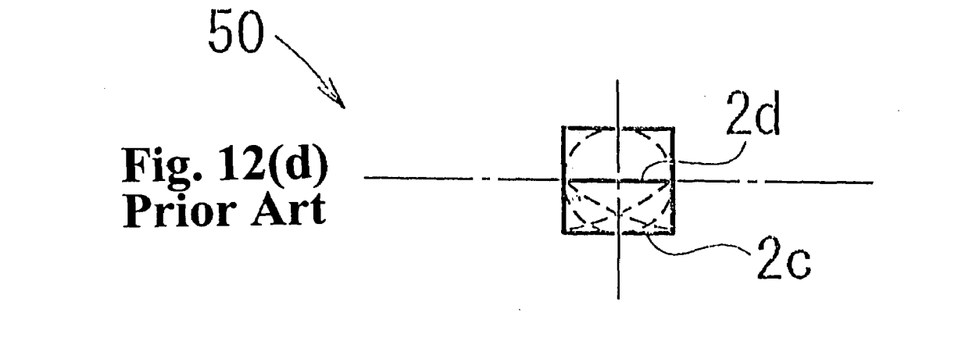

As shown in FIG. 12(a), a lower side part is folded over the central part along a predetermined first folding line 2a set close to the gas inlet 54. As shown in FIGS. 12(b) to 12(d), an end portion of the lower part is rolled along predetermined folding lines 2b, 2c and 2d toward the occupant side to form a lower deployment portion 62 shown in FIG. 13.

Figure 13:
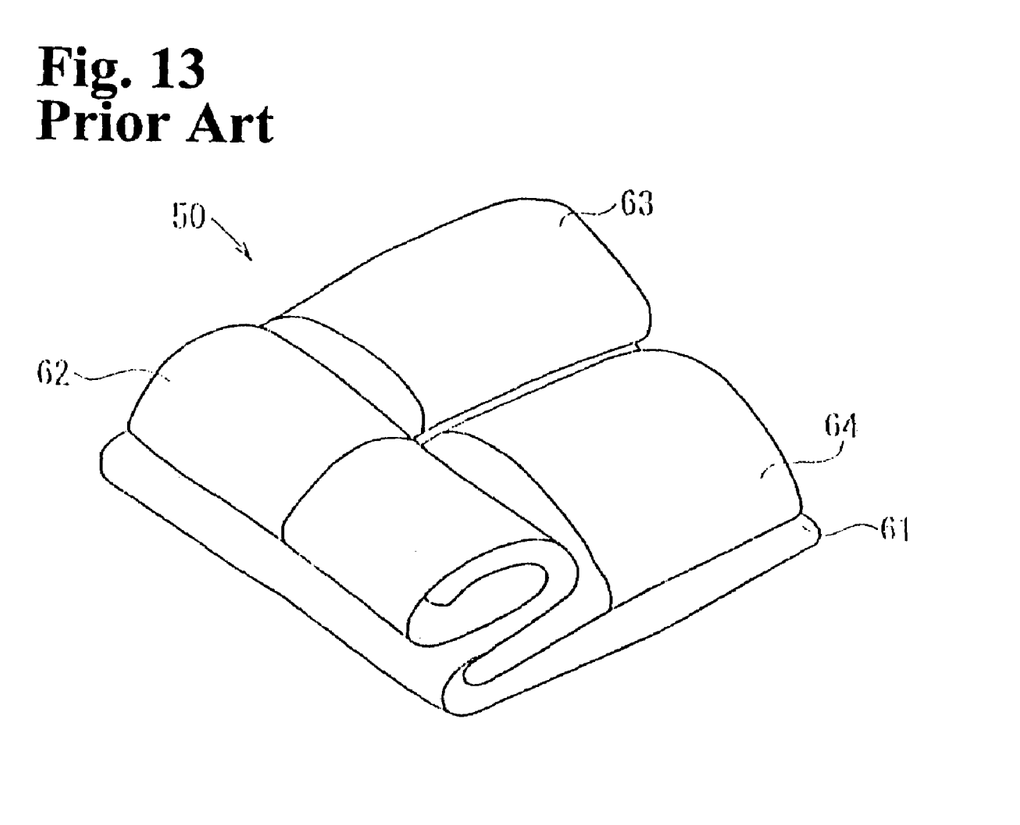
FIG. 13 is a diagram for illustrating a method of folding the airbag.

Consequently, as shown in FIG. 13, the right deployment portion 64 and the left deployment portion 63 are overlapped at the occupant side of the folded airbag, and the lower deployment portion 62 is further put over the deployment portions 63 and 64 at the occupant side.

Japanese Patent Publication (Kokai) No. 09-30425 has disclosed that in an airbag device in which only a module cover recedes and a horn switch is turned on so as to sound a horn when a module cover is pushed, a folded airbag is bound to a retainer with a band, and a space for recession of the module cover is formed between the module cover and the top surface of the folded airbag. In this case, the module cover is mounted on the retainer while being movable in a vertical direction (in the direction of approaching or receding from the occupant). An urging device, e.g., a spring, is provided for urging the module cover upwardly.

Airbag devices in which only a module cover recedes and a horn switch is turned on so as to sound a horn when a module cover is pushed have also been disclosed in Japanese Utility Model Publication (Kokai) No. 06-53324, Japanese Utility Model Publication (Kokai) No. 06-53365, and Japanese Utility Model Publication (Kokai) No. 05-92004.

As shown in FIG. 7, Japanese Patent Publication (Kokai) No. 2000-296746 has disclosed the airbag device as if an adequate inner space (clearance) is provided, and the front-end side of the inflator 14 is easily inserted into the airbag 12 through the inflator insertion port 34 and the mouth portion 24. However, FIG. 7 is just a schematic diagram, and in an actual device, the airbag is tightly folded multiple times with little clearance as shown in FIGS. 9(a)–9(f) to 13. Immediately after the airbag is folded (before the insertion of the inflator), the tightly folded airbag is disposed in layers on the plate-shaped portion 16a of the base plate 16. Accordingly, the top of the inflator insertion port of the base plate 16 is in a condition that the folded airbag tightly seals.

In assembling the airbag device with the shape-maintaining component, the front-end side of the inflator 14 is pushed into the folded airbag through the opening 34. Therefore, the operator is required to have a significant muscle power and, in addition, it takes long time to mount the inflator.

In view of the above-mentioned problems, an object of the present invention is to provide an airbag device with an airbag shape-maintaining component, wherein an inflator is easily mounted, and an assembling efficiency is excellent.

Further objects and advantages of the invention will be apparent from the following description of the invention.

SUMMARY OF THE INVENTION

According to the first aspect of the present invention, an airbag device includes an airbag having a front portion facing an occupant and a rear portion opposite to the front portion upon inflation; an inflator to inflate the airbag; a retainer on which the airbag and the inflator are mounted; and a shape-maintaining component covering the folded airbag to maintain a folded shape, wherein a front-end side of the inflator is inserted in the folded-airbag portion through an inflator insertion port provided on the retainer. The shape-maintaining component is connected to the above-described front portion of the above-described airbag, and the front-end side of the inflator is inserted between the airbag front portion connected to the shape-maintaining component and the inflator insertion port of the retainer.

According to an airbag device of the second aspect, in the airbag device of the first aspect, a connecting portion of the above-described shape-maintaining component and the airbag front portion is located in the direction of extension of the inflator insertion direction into the above-described inflator insertion port.

According to an airbag device of the third aspect, in the airbag device of the second aspect, the above-described connecting portion is located at the front side of the above-described folded airbag. A portion of the above-described airbag in the vicinity of the connecting extends from the front side toward the periphery of the above-described inflator insertion port.

According to an airbag device of the fourth aspect, in the airbag device of any one of the first to third aspects, a low-strength portion is provided in the above-described shape-maintaining component while surrounding the connecting portion of the above-described shape-maintaining component and the airbag. The shape-maintaining component is torn along the low-strength portion when the airbag is inflated.

In the airbag device of the present invention, since the shape-maintaining component is connected to the front portion of the airbag, the front portion of the airbag is located away from the inflator insertion port because the front portion of the airbag is pulled by the shape-maintaining component. Consequently, a space is provided between the airbag front portion and the inflator insertion port, so that the front-end side of the inflator is easily inserted into the folded body.

In the present invention, the connecting portion of the shape-maintaining component and the airbag front portion is preferably located in the direction of extension of the inflator insertion direction into the above-described inflator insertion port. With this configuration, the above-described space extends from the inflator insertion port toward the inflator insertion direction, so that the inflator is easily inserted.

In this case, the above-described connecting portion is preferably located at the front side of the above-described folded airbag, and a portion of the above-described airbag in the vicinity of the connecting portion extends from the front side toward the periphery of the above-described inflator insertion port. With this configuration, a size of the above-described space in the vicinity of the inflator insertion port is increased, so that the inflator is further easily inserted.

In the present invention, the low-strength portion may be provided in the shape-maintaining component while surrounding the connecting portion of the shape-maintaining component and the airbag. The shape-maintaining component may be torn along the low-strength portion when the airbag is inflated. With this configuration, the shape-maintaining component is torn along the low-strength portion when the airbag is inflated. Consequently, only the portion surrounded by the low-strength portion is left as a remaining piece attached to the inflating airbag.

DETAILED DESCRIPTION OF PREFERRED EMBODIMENTS

Figure 1:
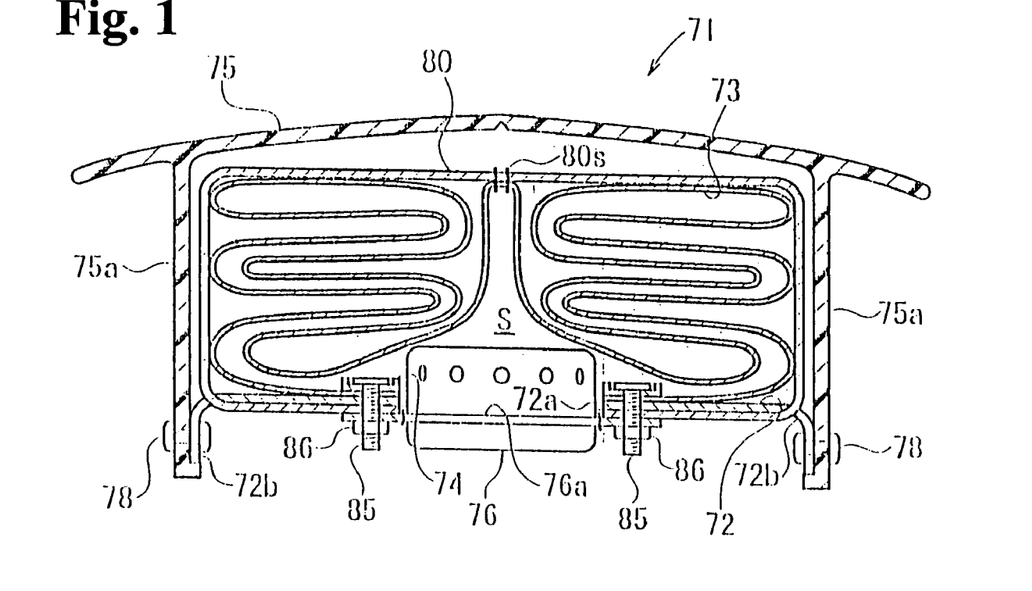
FIG. 1 is a vertical sectional view of an airbag device according to an embodiment.
Figures 2A, 2B:
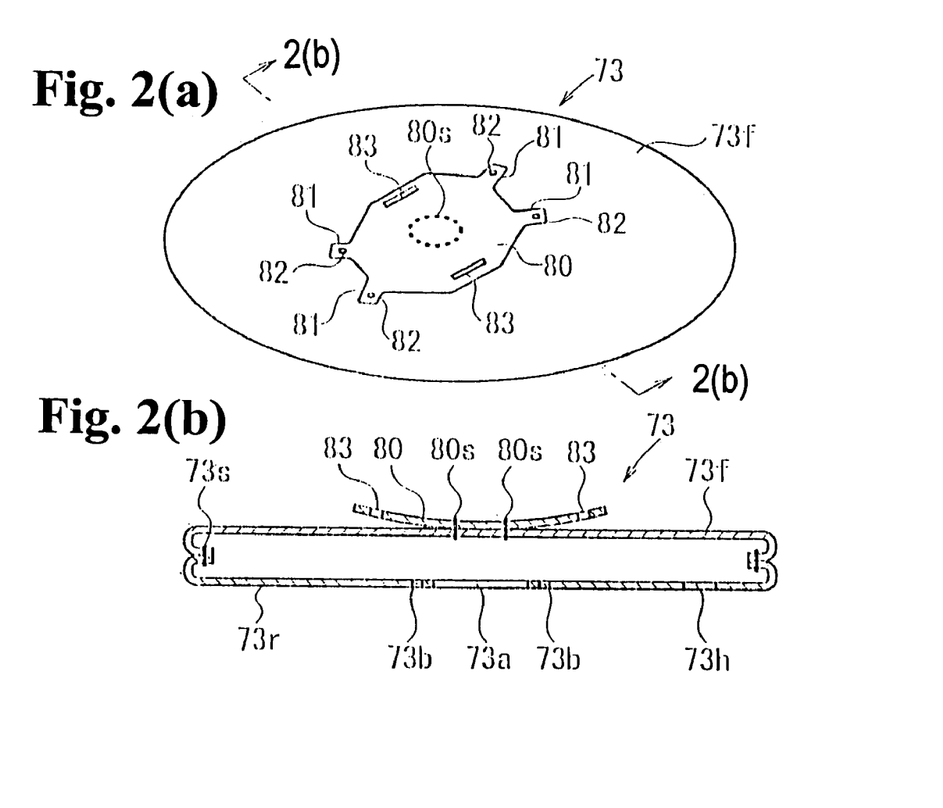
FIG. 2(a) is a perspective view of an airbag of the airbag device according to the embodiment.
FIG. 2(b) is a sectional view taken along line 2(b)—2(b) in FIG. 2(a)
Figure 3:
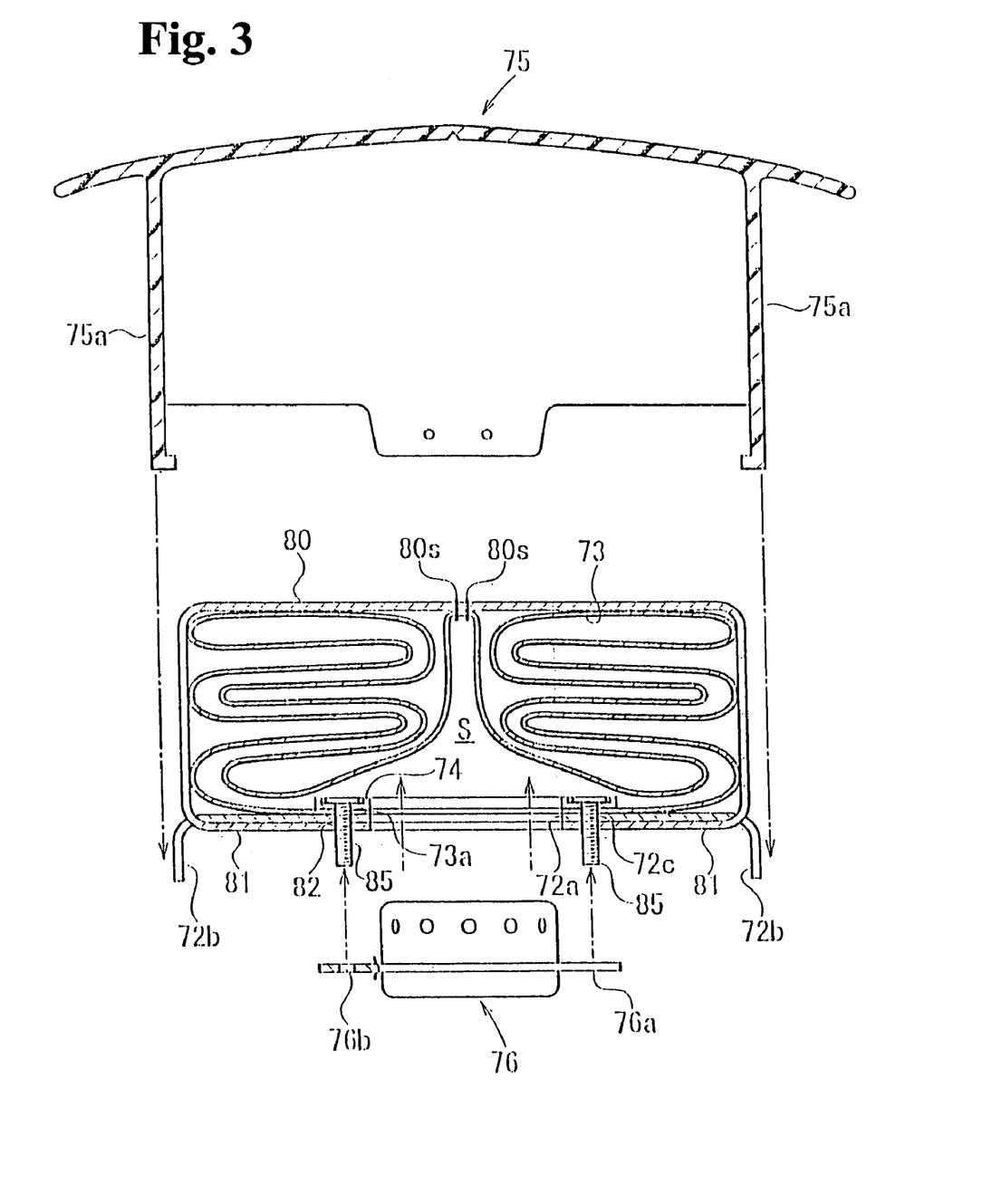
FIG. 3 is an exploded sectional view of the airbag device according to the embodiment.
Figure 4:
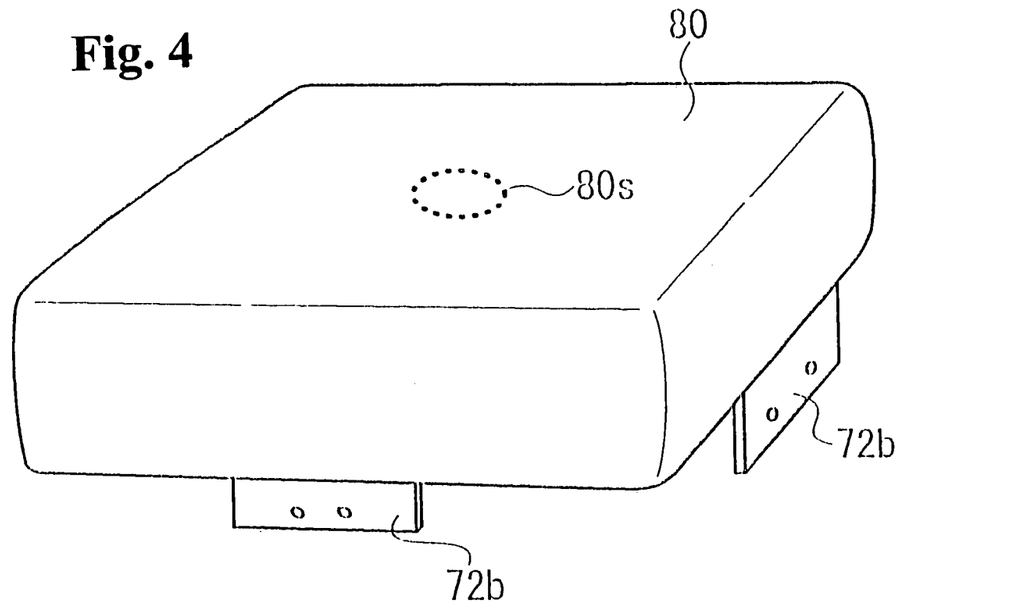
FIG. 4 is a perspective view of a folded body of the airbag device according to the embodiment.
Figure 5:
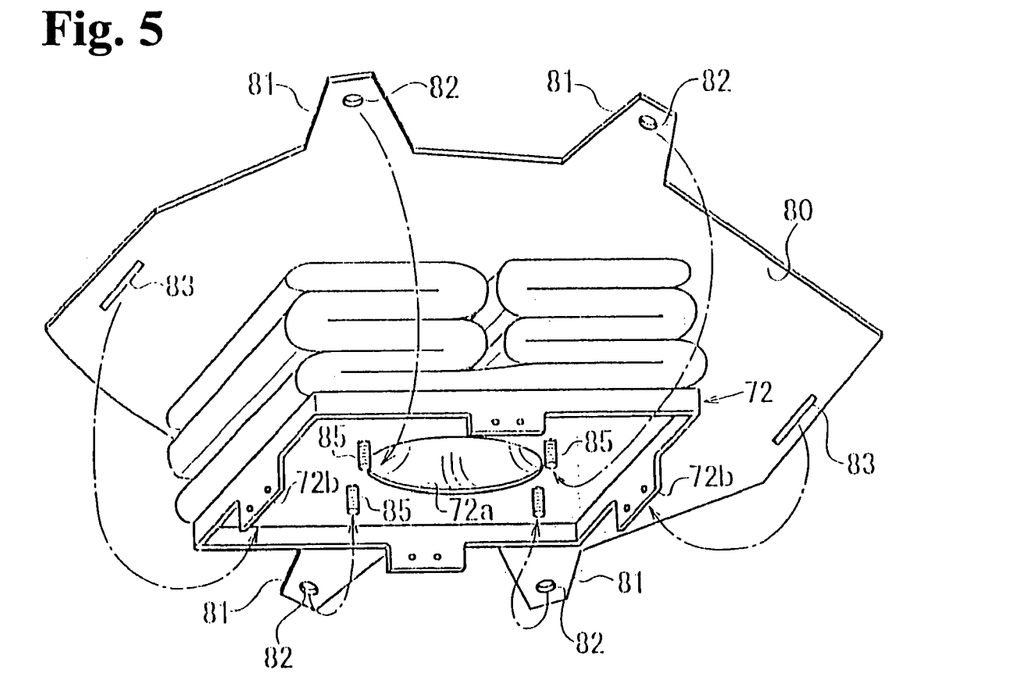
FIG. 5 is a perspective view showing a shape-maintaining component of the folded body shown in FIG. 4 in an expanded state.
Figure 6:
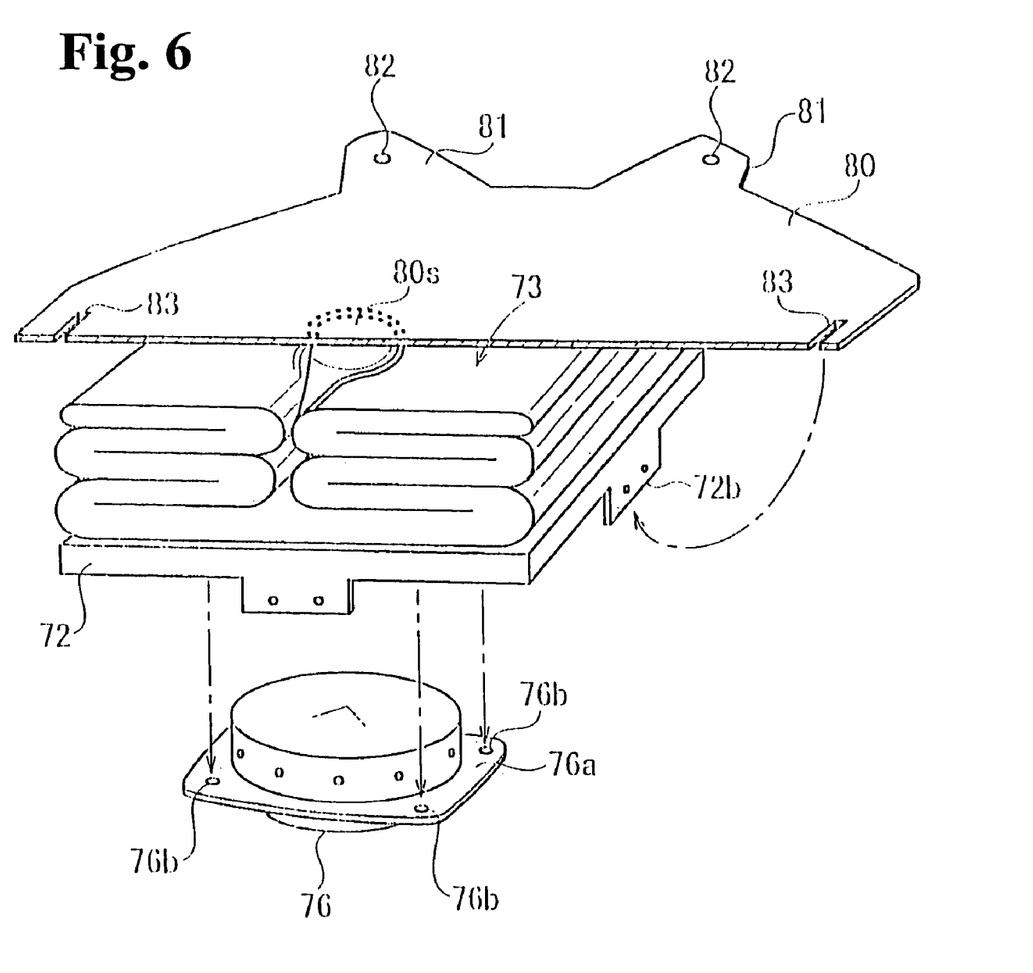
FIG. 6 is a perspective view of the state shown in FIG. 5 viewed from above.

Embodiments of the present invention will be described below with reference to the accompanying drawings. FIG. 1 is a vertical sectional view of a driver airbag device according to an embodiment. FIG. 2(a) is a perspective view of an airbag in a flat spread state before folding, and FIG. 2(b) is a sectional view taken along line 2(b)—2(b) in FIG. 2(a). FIG. 3 is an exploded view of the airbag device. FIG. 4 is a perspective view showing a folded body viewed from above. FIGS. 5 and 6 are perspective views showing the folded body (before a shape-maintaining component covers) viewed from below and above.

The airbag device 71 includes a retainer (base plate) 72, an airbag 73 mounted on the retainer 72 with an airbag-mounting ring 74, an inflator 76 to inflate the airbag 73, a shape-maintaining component 80 to maintain a folded shape of the airbag 73, a module cover 75 covering a folded body, and the like.

The retainer 72 is provided with an inflator insertion port 72a at a central portion thereof, and through holes 72c for bolts 85 (described later) are formed around the inflator insertion port 72a. A plurality of leg portions 72b for mounting the module cover protrudes at an edge of the retainer 72. Leg portions 75a of the module cover 75 are fixed to leg portions 72b with rivets 78.

The inflator 76 has a flange 76a. The bolts 85 protruding from the airbag-mounting ring 74 are inserted through the airbag 73, the retainer 72, and the flange 76a, and nuts 86 are screwed therein. In this manner, the inflator 76 is fixed to the retainer 72 together with the airbag 73. An edge portion of the shape-maintaining component 80 is held between the retainer 72 and the flange 76a, as described in detail.

As shown in FIG. 2(b), the airbag 73 is a driver airbag having a bag shape formed by sewing perimeters of a circular rear panel 73r and a front panel 73f overlapping each other with a seam thread 73s. An opening (mouth portion) 73a for inserting the inflator is provided at the center of the rear panel 73r, and the through holes 72c for the above-described bolts 85 are provided at the perimeter of the opening. Furthermore, the rear panel 73r is provided with a vent hole 73h for discharging gas from the airbag. Although not shown in the drawing, a reinforcing cloth is mounted around the opening 73a by sewing.

In the present embodiment, the shape-maintaining component 80 for maintaining the folded shape of the airbag 73 has a sheet shape. The central portion of the shape-maintaining component 80 and the central portion of the front panel 73f are connected with a seam thread 80s.

The shape-maintaining component 80 is provided with a flap-shaped extension portion 81 at each of four corners, and each extension portion 81 is provided with a small hole 82. Slits 83 are provided along opposing two sides of the shape-maintaining component 80.

A procedure of folding the airbag 73 is not specifically limited. The airbag 73 is folded such that an area projected onto the retainer 72 becomes equivalent to that of the retainer 72. The mounting ring 74 is inserted through the opening 73a into the airbag 73, and each bolt 85 is inserted through the bolt through hole 73b. Thereafter, the airbag 73 is folded.

The retainer 72 is put on the folded airbag, and the bolts 85 are inserted through the bolt through holes 72c. Subsequently, as shown in FIG. 5, the bolts 85 are inserted through respective small holes 82 of the shape-maintaining component 80. Then, a pair of leg portions 72b of the retainer 72 is inserted through the slits 83. In this manner, as shown in FIG. 4, the folded shape of the airbag is maintained by the shape-maintaining component 80.

The shape-maintaining component may be provided with other extension portions and small holes for temporary fixing, and the bolts 85 of the mounting ring may be inserted through the small holes for temporary fixing so as to temporarily fix the shape-maintaining component and the folded airbag before the folded airbag and the shape-maintaining component are mounted on the retainer.

In the folded body, as shown in FIG. 1 and FIG. 3, the shape-maintaining component 80 and the central portion of the front panel 73f are sewn, and the central portion of the front panel 73f is pulled up to the front side (occupant side) of the folded airbag by the shape-maintaining component 80. Consequently, a space S is formed at a backside of the inflator insertion port 72a of the retainer 72 by this pulling up.

As shown in FIG. 3, the inflator 76 is mounted on the resulting assembly of the folded body and the retainer 72. In this case, since the space S is formed inside the assembly, a front-end side of the inflator 76 is smoothly inserted into the folded body in the assembly through the inflator insertion port 72a and the airbag opening 73a.

In the present embodiment, as shown in FIGS. 1 and 3, the connecting portion of the shape-maintaining component 80 and the airbag front portion through the seam thread 80s is located at a front side of the folded airbag in the direction of extension of an insertion direction of the inflator 76 at the inflator insertion port 72a. A periphery of the connecting portion at the front side of the airbag spreads toward the perimeter of the inflator insertion port 72a in a truncated cone shape. Consequently, the space S adequate for easily inserting the front-end side of the inflator 76 is formed at the backside of the inflator insertion port 72a, so that the workability in mounting of the inflator 76 is excellent.

The flange 76a of the inflator 76 is put on the backside of the retainer 72. At this time, the bolts 85 are inserted through the bolt through holes 76b. The nuts 86 are screwed in the bolts 85. Subsequently, the module cover 75 is put over the folded body, and is fixed with rivets 78. In this manner, the airbag device shown in FIG. 1 is configured.

In the airbag device having such a configuration, in the event of a collision of the vehicle, the inflator 76 discharges gas to inflate the airbag 73. At this time, the shape-maintaining component 80 is torn around the small holes 82 and the slits 83, so that the airbag 73 is released from the constraint of the shape-maintaining component 80. Accordingly, the airbag 73 pushes the module cover 75 open so as to widely deploy in the room of the vehicle.

As described above, in the airbag device, since the space S is formed in the folded body, the mounting operation of the inflator 76 is significantly simplified. Since the folded shape of the airbag is maintained by the shape-maintaining component 80, the module cover 75 is easily mounted and, in addition, the folded shape of the airbag is maintained after being mounted on the vehicle.

Figure 14A:
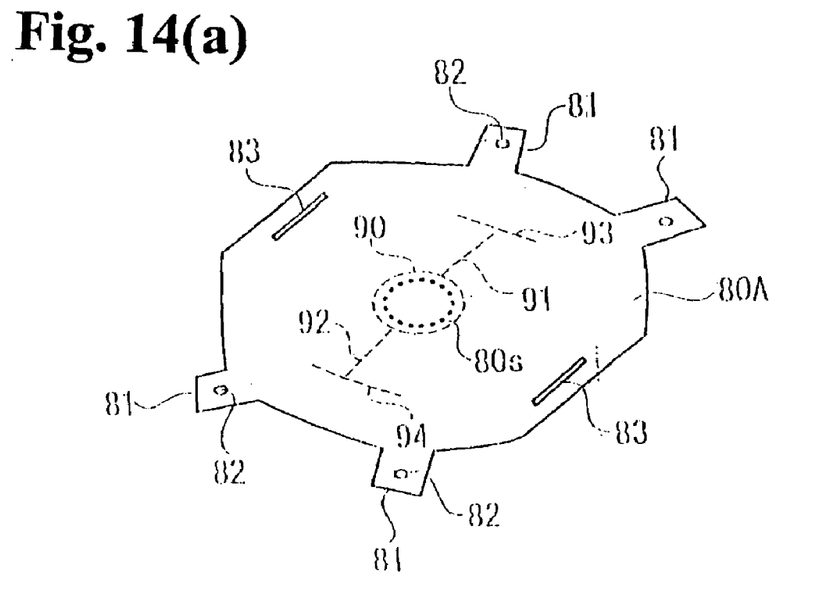
FIGS. 14(a) and 14(b) are views showing a shape-maintaining component according to another embodiment.
Figure 14B:
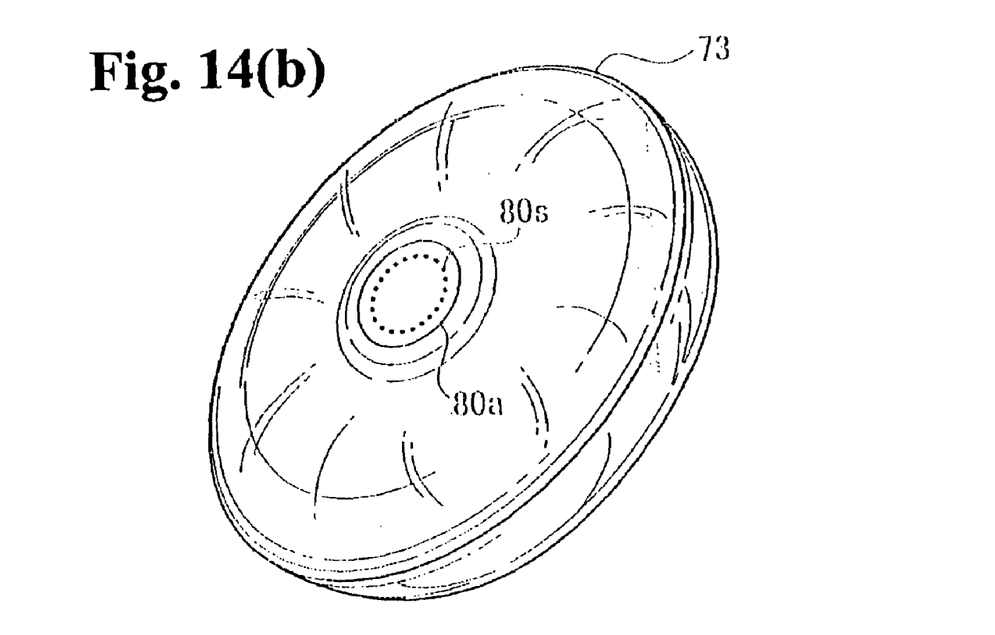

In the present invention, the shape-maintaining component may be partially provided with a low-strength portion, e.g., an incision, so that the shape-maintaining component 80 may be torn along the low-strength portion when the airbag is inflated. For example, as in a shape-maintaining component 80A shown in FIG. 14(a), a circular low-strength portion 90 surrounding the perimeter of the seams of the seam thread 80s at the central portion, radial low-strength portions 91 and 92 radially extending from the circular low-strength portion 90, and intersecting low-strength portions 93 and 94 extending from ends of the radial low-strength portions 91 and 92 in the direction orthogonal thereto may be provided. In this case, the shape-maintaining component 80A is torn along the low-strength portions 91 to 94 when the airbag is inflated, and only a circular remaining piece 80a is left on the front panel of the deployed airbag, as shown in FIG. 14(b).

In the above-described embodiment, the seams of the seam thread 80s have the circle shape. Alternatively, the seams may have various shapes, e.g., a straight line, a cross, and a letter H. The connecting portion of the shape-maintaining component and the airbag may be located other than the center of the front panel.

In the above-described embodiment, the module cover 75 is mounted on the retainer 72 with the rivets 78. However, the present invention can be applied to an airbag device in which a module cover is attached to the retainer movably in a vertical direction, and only a module cover recedes and a horn switch is turned on so as to sound a horn when the module cover is pushed, as disclosed in Japanese Utility Model Publication (Kokai) No. 05-92004, Japanese Utility Model Publication (Kokai) No. 06-53324, Japanese Utility Model Publication (Kokai) No. 06-53365, and Japanese Patent Publication (Kokai) No. 9-30425.

The above-described embodiment is related to the driver airbag device. However, the present invention can be applied to other airbags, e.g., a passenger airbag.

While the invention has been explained with reference to the specific embodiments of the invention, the explanation is illustrative and the invention is limited only by the appended claims.

What is claimed is:

1. An airbag device for protecting an occupant of a vehicle, comprising:
    an airbag having a front portion facing the occupant and a rear portion opposite to the front portion when the airbag is inflated,
    an inflator attached to the rear portion of the airbag for inflating the airbag,
    a retainer attached to the airbag and the inflator and having an insertion port for inserting one end of the inflator, said airbag being folded and mounted on one side of the retainer, and
    a shape-maintaining component having a first connecting portion connected to the front portion of the airbag and a second connecting portion attached to a lower part of the retainer for covering the airbag in a folded state so that the one end of the inflator is placed in the insertion port behind the first connecting portion, said shape-maintaining component covering an upper portion of the folded airbag located on said one side of the retainer and extending from said upper portion to the other side of the retainer to attach and hold the folded airbag to the retainer.

2. An airbag device according to claim 1, wherein said first connecting portion of the shape-maintaining component is located above the insertion port.

3. An airbag device according to claim 2, wherein said shape-maintaining component at the front portion of the airbag extends from the front portion toward a periphery of the retainer.

4. An airbag device according to claim 1, wherein said shape-maintaining component includes a tearing portion around the first connecting portion, said tearing portion being torn when the airbag is inflated.

5. An airbag device according to claim 1, wherein said shape-maintaining component includes a main part having said first connecting portion, and said second connecting portion is formed of a plurality of flaps extending outwardly from the main part and connected to the lower part of the retainer.

6. An airbag device for protecting an occupant of a vehicle, comprising:

an airbag having a front portion facing the occupant and a rear portion opposite to the front portion when the airbag is inflated, an inflator, attached to the rear portion of the airbag for inflating the airbag, a retainer attached to the airbag and the inflator and having an insertion port for inserting one end of the inflator, a shape-maintaining component including a main part having a first connecting portion connected to the front portion of the airbag, and a second connecting portion attached to a lower part of the retainer for covering the airbag in a folded state so that the one end of the inflator is placed in the insertion port behind the first connecting portion, said second connecting portion being formed of a plurality of flaps extending outwardly from the main part and connected to the lower part of the retainer, and a mounting ring disposed inside the airbag and having attaching members protruding from the mounting ring, said plurality of flaps being attached to the attaching members.

7. An airbag device for protecting an occupant of a vehicle, comprising:

an airbag having a front portion facing the occupant and a rear portion opposite to the front portion when the airbag is inflated, an inflator attached to the rear portion of the airbag for inflating the airbag, a retainer attached to the airbag and the inflator and having an insertion port for inserting one end of the inflator, and a shape-maintaining component including a main part having a first connecting portion connected to the front portion of the airbag, and a second connecting portion attached to a lower part of the retainer for covering the airbag in a folded state so that the one end of the inflator is placed in the insertion port behind the first connecting portion, said second connecting portion being formed of a plurality of flaps extending outwardly from the main part and connected to the lower part of the retainer, wherein said shape-maintaining component further includes a plurality of slits at the main part, through which parts of the retainer pass.

8. An airbag device according to claim 6, wherein said shape-maintaining component includes a tearing portion around the first connecting portion, said tearing portion being torn when the airbag is inflated.

9. An airbag device according to claim 5, wherein said main part substantially entirely covers the folded airbag on the retainer, and the first connecting portion is fixed to the front portion of the airbag.

10. An airbag device according to claim 5, wherein said main part spreads substantially flatly on the folded airbag on the retainer so that a center part of the front portion of the airbag is located adjacent the main part.

* * * * *